C. D. House.
Apple Cutting and Coring Knife.

Nº 86,401. Patented Feb. 2, 1869.

Witnesses;
John Aldrich
C. P. S. Wardwell

Inventor;
Charles D. House

CHARLES D. HOUSE, OF LAKE VILLAGE, NEW HAMPSHIRE.

Letters Patent No. 86,401, dated February 2, 1869.

IMPROVEMENT IN KNIVES FOR CUTTING AND CORING APPLES.

The Schedule referred to in these Letters Patent and making part of the same.

*To whom it may concern:*

Be it known that I, CHARLES D. HOUSE, of Lake Village, in the county of Belknap, and State of New Hampshire, have invented a new and useful Improvement in Apple-Cutting and Coring Knives; and I do hereby declare that the following is a full and exact description thereof, reference being had to the accompanying drawings, and to the letters of reference marked thereon.

The nature of my invention consists in constructing a knife, and combining therewith a coring-device, so an apple can be quartered, or "cut and cored," in a superior manner, and also pared, if desired, with the same knife.

Figure 1:
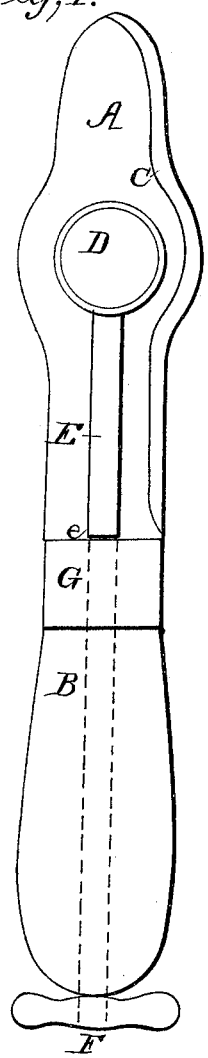
Figure 2:
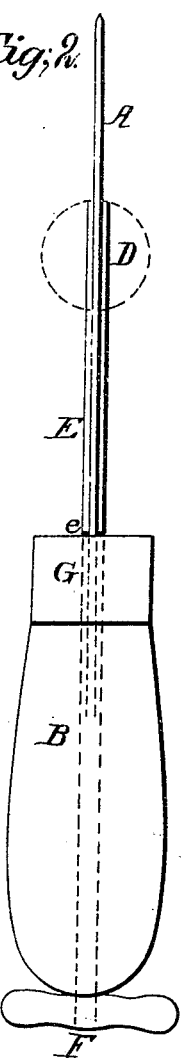
Figure 3:

Figure 1 is a side view.
Figure 2 is an edge view.
Figure 3 is a cross-section of the coring-cutter.

To enable others skilled in the art to make and use my invention, I will proceed to describe its construction and operation.

A is the blade, of steel or other material, which is attached to the handle B in any suitable manner.

This blade A is sharpened on one of its edges, as shown by the line C, fig. 1, and is also perforated, to receive a coring-cutter, D, and its shaft E, shown in red, and allow them to turn freely.

The cutter D is sharpened on both edges, as shown in section, fig. 3, to allow it to be operated in either direction. It is also thicker, from edge to edge, than the blade, to obtain the proper strength, but not sufficiently to obstruct its entrance into an apple.

E is a shank, or axial shaft, attached to cutter D, and extends longitudinally through the handle B, and is connected with handle F, by which the cutter D is operated.

The shaft e has a small shoulder, e, where it enters the handle, to keep it from moving into the handle too far.

The small handle F holds it from moving in the opposite direction.

The dotted line, fig. 2, which surrounds D, shows the position of coring-cutter D, when turned one-quarter round.

G is a ferrule, like those ordinarily used for tool-handles.

The operation of this knife is as follows:

The apple, having, if desired, previously been pared by this knife or a machine, is held in one hand. The knife is then thrust into the apple, so the cutter D shall be in the centre, and the coring-cutter D turned one-half of a revolution by the handle F, with the hand which held the knife, the other hand still retaining the apple. The hold upon the handle is now renewed, and the knife passed to and through one side of the apple, and the apple divided into halves, when the core drops out in the shape of two hemispheres.

The particular shape of the cutter D is not material, provided it properly cuts out the core.

Should a small apple split, in the act of inserting the knife-blade, the parts can be easily retained in place by the hand while the process of coring is completed.

This knife may be modified by making the blade in two parts, by dividing in the centre, from the point to the coring-cutter D, and hinging the parts to the handle, and attaching handles to them, similar to the handles of shears, and having both edges of the knife sharpened, so that by pressing the handles toward each other after the apple is cored, the cutting-edges of the knife will open outward and divide the apple.

What I claim as my invention, and desire to secure by Letters Patent, is—

An apple-coring and cutting knife, constructed and operated substantially in the manner and for the purpose set forth.

CHARLES D. HOUSE.

Witnesses:
JOHN ALDRICH,
C. P. S. WARDWELL.